Patented Dec. 6, 1932

1,890,098

UNITED STATES PATENT OFFICE

WILLIAM SMITH AND JOHN THOMAS, OF GRANGEMOUTH, SCOTLAND, ASSIGNORS TO SCOTTISH DYES, LIMITED, OF GRANGEMOUTH, SCOTLAND

PRODUCTION OF FLAVANTHRONE DYESTUFF INTERMEDIATES

No Drawing. Application filed March 31, 1928, Serial No. 266,452, and in Great Britain May 26, 1926.

This invention relates to the production of flavanthrone dyestuff intermediates.

As a result of researches, we have found among other things that if anthraquinone derivatives, particularly 1-halogen-2-amino derivatives are converted into 1-halogen-2-urethane derivatives they may then be transferred smoothly into the corresponding flavanthrone type products.

We have also found that if the conditions for the condensation of two molecules of 1-halogen-2-urethane-anthraquinone derivatives are less drastic, a product is formed which we regard as 1:1'-dianthraquinonyl-2:2'-diurethane derivative. Dianthraquinonyl bodies of this character furnish valuable dyestuff intermediate products and usually may be readily purified and smoothly converted by a variety of methods into flavanthrone derivatives.

The invention in brief consists in a process for the formation of 1:1'-dianthraquinonyl-2:2'-diurethane derivatives by the condensation of two molecules of 1-halogen-2-urethane-anthraquinone derivatives.

The invention includes the extraction or purification of dianthraquinonyl-diurethane condensation products prepared as indicated above by means of organic solvents, for example mono-chlor-benzol.

The invention includes a modified method of working up the reaction mixture, filtration of the mixture whilst hot, whereby the 1:1'-dianthraquinonyl-2:2'-diurethane derivatives may be separated by reason of their solubility in the hot solvent.

The invention also consists in processes and products substantially as herein described.

The following examples illustrate how the invention may be carried into effect, all parts being parts by weight:—

Example 1

According to this example 20 parts of ethyl urethane prepared from 1-chlor-2-amino-anthraquinone and ethyl chloro-formate are suspended in 80 parts of nitro-benzene and 8 parts of copper powder are added to the mixture. The contents are well stirred and the melt heated at 160° for several hours. At the end of this time the mixture is cooled down and filtered. There is thus obtained product in crude or impure form having the structural formula 1:1'-dianthraquinonyl-2:2'-diurethane, this crude product containing copper and any flavanthrone that has been formed. The probable course of the reaction is the conversion of the 1-chlor-2-amino-anthraquinone into anthraquinone-1-chlor-2-ethyl-urethane, two molecules of which combine with one molecule of copper to form one molecule of 1:1'-dianthraquinonyl-2:2'-diethyl urethane and one molecule of cupric chloride.

This 1:1'-dianthraquinonyl-2:2'-diurethane is readily extracted from this crude product by treatment with an organic solvent, for example mono-chlor-benzol, from which it crystallizes on concentration in magnificent glistening yellow plates which melt above 250° C.

Example 2

An alternative method of working up the reaction mixture is to filter at about 160° C., after the reaction is completed. There is thus left behind on the filter apparently any flavanthrone that may have been formed, as well as the unchanged copper and salts of copper. The filtrate, on cooling, deposits the aforesaid 1:1'-dianthraquinonyl-2:2'-diurethane in a purified form.

General

Modifications may be made in the processes described above; for instance urethanes other than those mentioned may be employed, for example those obtained by the action of butyl-chlor-formate or phenyl-chlor-formate on 1-chlor-2-amino-anthraquinone. The product in the first case is anthraquinone-1-chlor-2-butyl-urethane which, used as a starting material, yields 1:1'-dianthraquinonyl-2:2'-dibutyl urethane, and in the case of the phenyl body, the product is anthraquinone-1-chlor-2-phenyl urethane which yields 1:1'-dianthraquinonyl-2:2'-diphenyl urethane. Instead of 1-chlor-2-amino-anthraquinone, the corresponding brom derivative can be used. The two corresponding derivatives obtained from the brom-body are respectively anthraquinone-1-bromo-2-butyl urethane and anthraquinone-1-bromo-2-phenyl urethane, these yielding dibutyl urethane and 1:1'-dianthraquinonyl-2:2'-1:1'-dianthraquinonyl-2:2'-diphenyl urethane respectively. Other derivatives and higher halogenated amino-chloranthraquinones containing the grouping 1-halogen-2-amino-anthraquinone can be used for example 1-3-dibrom-2-amino-anthraquinone. In this case, the butyl and phenyl products are anthraquinone-1:3-dibrom-2-butyl urethane, and anthraquinone-1:3-dibrom-2-phenyl urethane, which yield respectively 1:1'-dianthraquinonyl-3:3'-dibrom-2:2'-dibutyl urethane, and 1:1'-dianthraquinonyl 3:3'-dibrom-2:2'-diphenyl urethane.

The condensation can be carried out in other media besides nitrobenzene for example naphthalene as indicated above and in some cases the reaction can be caused to proceed by dry baking for example in the manner described.

Dianthraquinonyl-diurethane prepared as described above usually dissolves in alkaline hydrosulphite with a red vat but this vat does not dye cotton and the colour of this vat distinguishes it from flavanthrone which gives royal blue vat.

Various 1-halogen-2-amino-anthraquinone derivatives referred to above may be treated according to the present invention by processes such as those indicated.

The conversion of 1-halogen-2-urethane anthraquinone derivatives to flavanthrone may be effected directly at a high temperature in an inert solvent in the presence of a finely divided metal such as copper, or the process may be carried out in two stages as indicated above when the process is stopped at a point where the 1:1'-dianthraquinonyl-2:2'-diurethane derivative has been prepared. This derivative may then be purified, if necessary, and afterwards converted by the methods described to the flavanthrone derivatives.

The 1:1'-dianthraquinonyl-2:2'-diurethane derivatives may be converted into the flavanthrone derivatives by any of the following treatments:—
 (1) Heating in sulphuric acid.
 (2) Heating in alcoholic potash.
 (3) Dry baking.
 (4) Heating at a high temperature in an inert solvent.

As has been shown, the new product 1:1'-dianthraquinonyl-2:2'-diurethane can be purified from a variety of solvents. It can be converted into flavanthrone derivatives in many ways.

What we claim is:—
1. 1:1'-dianthraquinonyl-2:2'-diurethane.
2. 1:1'-dianthraquinonyl-2:2'-diurethanes.
3. 1:1'-dianthraquinonyl-2:2'-dialkyl-urethanes.
4. The process which consists in heating anthraquinone-1-halogen-2-urethanes with metallic copper at a temperature between about 135° C. and 175° C.
5. A process which consists in heating anthraquinone-1-halogen-2-urethanes with metallic copper in the presence of an inert organic medium at a temperature of between about 135° C. to 175° C.
6. A process for the formation of flavanthrone dyestuff intermediates which consists in condensing two molecules of anthraquinone-1-halogen-2-urethanes in the presence of metallic copper and of an inert aromatic solvent of high boiling point at a temperature of between about 135° C. to about 175° C.

In testimony whereof we have signed our names to this specification.
WILLIAM SMITH.
JOHN THOMAS.